US010650085B2

(12) United States Patent
Masterson et al.

(10) Patent No.: US 10,650,085 B2
(45) Date of Patent: May 12, 2020

(54) PROVIDING INTERACTIVE PREVIEW OF CONTENT WITHIN COMMUNICATION

(71) Applicant: Microsoft Technology Licensing, LLC, Redmond, WA (US)

(72) Inventors: Joey Masterson, Issaquah, WA (US); Kenneth Fern, Bellevue, WA (US); Rebecca Lawler, Seattle, WA (US); Hayley Steplyk, Cambridge, MA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 331 days.

(21) Appl. No.: 14/669,988

(22) Filed: Mar. 26, 2015

(65) Prior Publication Data
US 2016/0283447 A1    Sep. 29, 2016

(51) Int. Cl.
*G06F 17/22* (2006.01)
*G06Q 10/10* (2012.01)
*G06F 3/0484* (2013.01)
*G06F 17/21* (2006.01)

(52) U.S. Cl.
CPC ........ *G06F 17/2235* (2013.01); *G06F 3/0484* (2013.01); *G06F 3/04842* (2013.01); *G06F 17/212* (2013.01); *G06Q 10/107* (2013.01)

(58) Field of Classification Search
CPC .. G06F 17/2235; G06F 17/212; G06F 3/0484; G06F 3/04842; G06Q 10/107
See application file for complete search history.

(56) References Cited

U.S. PATENT DOCUMENTS

| | | | |
|---|---|---|---|
| 7,162,488 B2 * | 1/2007 | DeVorchik | G06F 17/301 |
| 7,599,935 B2 | 10/2009 | La Rotonda et al. | |
| 7,917,591 B2 | 3/2011 | Vakkalanka | |
| 8,135,617 B1 * | 3/2012 | Agostino | G06Q 30/0241 |
| | | | 705/1.1 |
| 8,140,905 B2 | 3/2012 | Beaty et al. | |
| 8,185,591 B1 * | 5/2012 | Lewis | H04L 51/08 |
| | | | 358/1.15 |
| 8,201,096 B2 | 6/2012 | Robert et al. | |
| 8,204,717 B2 | 6/2012 | McLaughlin et al. | |
| 8,516,038 B2 | 8/2013 | Jalon et al. | |
| 8,578,261 B1 | 11/2013 | Gupta et al. | |

(Continued)

OTHER PUBLICATIONS

"Second Written Opinion Received for PCT Application No. PCT/US2016/023497", dated Feb. 20, 017, 5 Pages.

(Continued)

*Primary Examiner* — Renee D Chavez
*Assistant Examiner* — Jeremy L Stanley
(74) *Attorney, Agent, or Firm* — Michael Best & Friedrich LLP

(57) ABSTRACT

An interactive preview of a content within a communication is provided. An application such as a communication application retrieves metadata of a content from a content provider, in response to a detection of an insertion of a link of the content into a message. An interactive preview of the content is generated based on the metadata. The interactive preview provides actions to manage the interactive preview and the content. The interactive preview is inserted into the message in proximity to the link. Custom operations associated with the actions are executed in response to a transmission of the message.

18 Claims, 10 Drawing Sheets

(56) References Cited

U.S. PATENT DOCUMENTS

| | | | |
|---|---|---|---|
| 8,661,036 B2* | 2/2014 | Turski | G06F 17/30067 |
| | | | 707/737 |
| 8,819,701 B2 | 8/2014 | Wheeler et al. | |
| 8,954,579 B2 | 2/2015 | Do et al. | |
| 9,021,428 B2 | 4/2015 | Ajith Kumar et al. | |
| 9,298,355 B1* | 3/2016 | Beausoleil | G06F 3/04842 |
| 9,442,903 B2* | 9/2016 | Katic | G06F 17/30899 |
| 9,674,583 B2* | 6/2017 | Fisher | H04N 21/6581 |
| 2002/0075312 A1* | 6/2002 | Amadio | G06F 9/4825 |
| | | | 715/764 |
| 2004/0205514 A1 | 10/2004 | Sommerer et al. | |
| 2004/0225381 A1 | 11/2004 | Ritz et al. | |
| 2005/0015678 A1 | 1/2005 | Miller | |
| 2006/0069990 A1 | 3/2006 | Yozell-Epstein et al. | |
| 2006/0070077 A1 | 3/2006 | Erlandson et al. | |
| 2006/0136456 A1* | 6/2006 | Jacobs | G06F 17/30061 |
| 2006/0242286 A1 | 10/2006 | Hawkins et al. | |
| 2007/0118872 A1 | 5/2007 | Song et al. | |
| 2007/0297029 A1 | 12/2007 | Low et al. | |
| 2008/0109712 A1 | 5/2008 | McBrearty et al. | |
| 2008/0282159 A1* | 11/2008 | Vanderwende | G06F 17/30719 |
| | | | 715/700 |
| 2009/0013216 A1 | 1/2009 | Abrashkevich et al. | |
| 2009/0055684 A1 | 2/2009 | Jamjoom et al. | |
| 2009/0106674 A1 | 4/2009 | Bray et al. | |
| 2009/0260060 A1* | 10/2009 | Smith | H04L 63/105 |
| | | | 726/3 |
| 2009/0313100 A1 | 12/2009 | Ingleshwar | |
| 2009/0319618 A1* | 12/2009 | Affronti | G06Q 10/107 |
| | | | 709/206 |
| 2010/0229022 A1 | 9/2010 | Anand et al. | |
| 2010/0235395 A1* | 9/2010 | Cepuran | G06Q 10/107 |
| | | | 707/783 |
| 2010/0329642 A1* | 12/2010 | Kam | G06F 3/04817 |
| | | | 386/280 |
| 2011/0153605 A1* | 6/2011 | Silverman | G06F 17/30265 |
| | | | 707/737 |
| 2011/0167469 A1 | 7/2011 | Letca et al. | |
| 2011/0302308 A1* | 12/2011 | Prodan | G06Q 20/10 |
| | | | 709/225 |
| 2012/0150989 A1* | 6/2012 | Portnoy | G06F 17/30876 |
| | | | 709/217 |
| 2012/0151379 A1* | 6/2012 | Schultz | H04L 51/08 |
| | | | 715/752 |
| 2012/0179703 A1* | 7/2012 | Ajitomi | G06F 17/30386 |
| | | | 707/765 |
| 2012/0192064 A1* | 7/2012 | Antebi | G06Q 10/10 |
| | | | 715/255 |
| 2012/0278401 A1* | 11/2012 | Meisels | G06F 17/24 |
| | | | 709/206 |
| 2012/0278402 A1* | 11/2012 | Limont | G06Q 10/107 |
| | | | 709/206 |
| 2012/0278403 A1* | 11/2012 | Costenaro | G06F 17/30873 |
| | | | 709/206 |
| 2012/0278404 A1* | 11/2012 | Meisels | G06Q 10/107 |
| | | | 709/206 |
| 2012/0284344 A1* | 11/2012 | Costenaro | G06F 17/241 |
| | | | 709/206 |
| 2012/0284345 A1* | 11/2012 | Costenaro | G06Q 10/107 |
| | | | 709/206 |
| 2013/0198600 A1* | 8/2013 | Lockhart | G06F 17/241 |
| | | | 715/230 |
| 2013/0275422 A1 | 10/2013 | Silber et al. | |
| 2013/0311902 A1 | 11/2013 | O'Shaugnessy et al. | |
| 2014/0040226 A1 | 2/2014 | Sadhukha et al. | |
| 2014/0189534 A1* | 7/2014 | Liu | G06F 17/30899 |
| | | | 715/753 |
| 2014/0281895 A1* | 9/2014 | Tay | G06F 17/212 |
| | | | 715/234 |
| 2014/0310222 A1 | 10/2014 | Davlos et al. | |
| 2014/0344658 A1* | 11/2014 | Srinivasan | G06F 17/2235 |
| | | | 715/205 |
| 2014/0372877 A1 | 12/2014 | Snyder et al. | |
| 2015/0106877 A1* | 4/2015 | Meyers | H04L 51/34 |
| | | | 726/3 |
| 2015/0134723 A1 | 5/2015 | Kansal et al. | |
| 2015/0143211 A1* | 5/2015 | Kaufthal | G06F 17/24 |
| | | | 715/205 |
| 2015/0148328 A1 | 5/2015 | El-ahmad et al. | |
| 2015/0149611 A1 | 5/2015 | Lissack | |
| 2015/0154156 A1* | 6/2015 | Meyers, Jr. | G06F 17/2235 |
| | | | 715/205 |
| 2015/0161123 A1 | 6/2015 | Sterling et al. | |
| 2015/0186390 A1* | 7/2015 | Katic | H04L 67/2842 |
| | | | 709/203 |
| 2015/0195182 A1 | 7/2015 | Mathur et al. | |
| 2015/0195330 A1* | 7/2015 | Lee | H04L 67/02 |
| | | | 709/204 |
| 2015/0200885 A1* | 7/2015 | Sharp | H04L 51/08 |
| | | | 709/206 |
| 2015/0248421 A1 | 9/2015 | Hsiao et al. | |
| 2016/0036670 A1 | 2/2016 | Sadovsky et al. | |
| 2016/0094499 A1* | 3/2016 | Uraizee | H04L 51/08 |
| | | | 715/752 |
| 2016/0196013 A1* | 7/2016 | Gardenfors | G06F 3/0482 |
| | | | 715/783 |
| 2017/0090705 A1* | 3/2017 | Fern | G06F 3/0481 |
| 2017/0286199 A1 | 10/2017 | Soini et al. | |
| 2018/0095814 A1 | 4/2018 | Patil et al. | |
| 2018/0097711 A1 | 4/2018 | Nallabothula et al. | |
| 2020/0036613 A1 | 1/2020 | Nallabothula et al. | |

OTHER PUBLICATIONS

"The evolution of email", Published on: Mar. 31, 2014 Available at: http://blogs.office.com/2014/03/31/the-evolution-of-email/.

Premick, Justin, "Video in Email: One Step Closer to Reality?", Retrieved on: Jan. 28, 2015 Available at: http://blog.aweber.com/email-marketing/video-email-closer.htm.

Hall, Stephen, "Google+ Hangouts Drive app Discontinued, Replaced with Inline Chat Sharing", Published on: Nov. 19, 2014 Available at: http://9to5google.com/2014/11/19/google-hangouts-drive-app-discontinued-replaced-with-in line-chat-sharing/.

Mathur, Vaibhav, "Yammer Roadmap and Work-like-a-Network", Published on: May 9, 2014 Available at: http://blogs.perficient.com/microsoft/2014/05/yammer-roadmap-and-work-like-a-network/.

"Inline Preview Images", Published on: Aug. 6, 2013 Available at: https://developers.google.com/speed/pagespeed/module/filter-inline-preview-images.

"International Search Report and Written Opinion Issued in PCT Application No. PCT/US2016/023497", dated Jun. 10, 2016, 10 Pages.

"International Preliminary Report on Patentability Issued in PCT Application No. PCT/US2016/023497", dated Jun. 8, 2017, 6 Pages.

"Fix Outlook Account Problems in Office 365", Retrieved From https://web.archive.org/web/20161220173643/https://portal.office.com/support/help.aspx?sid=sara#/, Retrieved on Jun. 29, 2016, 3 Pages.

"IBM Support Assistant", Retrieved From https://www-01.ibm.com/software/support/isa/, Apr. 13, 2014, 1 Page.

"Monitor Health and Performance of your Cloud Computing Resources", Retrieved From https://www.manageengine.com/products/applications_manager/cloud-monitoring.html, Mar. 31, 2011, 3 Pages.

"Monitoring Uptime for your Site", Retrieved From https://web.archive.org/web/20150906132850/https://docs.acquia.com/network/health, Sep. 6, 2015, 8 Pages.

"Support and Recovery Assistant for Office365 Available", Retrieved From http://www.sharepointgeoff.com/support-recovery-assistant-office365/, Oct. 13, 2015, 4 Pages.

"Vmware: Knowledge Base", Retrieved From https://kb.vmware.com/selfservice/microsites/search.do?language=en_US&cmd=displayKC&externalId=2129384, Retrieved on Jun. 29, 2016, 4 Pages.

"Non Final Office Action Issued in U.S. Appl. No. 15/283,276", dated May 31, 2018, 16 Pages.

(56) References Cited

OTHER PUBLICATIONS

"Non Final Office Action Issued in U.S. Appl. No. 15/283,524", dated Apr. 25, 2018, 17 Pages.

Abdul, "5 Cloud Performance Monitoring Tools", Retrieved From https://web.archive.org/web/20120728074517/http://cloudtweaks.com/2012/07/5-cloud-performance-monitoring-tools/, Jul. 25, 2012, 6 Pages.

Bekker, Scott, "Office 365 Tool Tells Partners About Customer Service Outages", Retrieved From https://rcpmag.com/blogs/scott-bekker/2014/01/office-365-tool-service-outages.aspx, Jan. 29, 2014, 3 Pages.

Boucher, Rob, "How to Monitor Cloud Services", Retrieved From https://web.archive.org/web/20160115211903/https://azure.microsoft.com/en-us/documentation/articles/cloud-services-how-to-monitor/, Jan. 4, 2016, 9 Pages.

Hogg, Jason, "Monitor, Diagnose, and Troubleshoot Microsoft Azure Storage", Retrieved From http://web.archive.org/web/20151001104257/https://azure.microsoft.com/en-in/documentation/articles/storage-monitoring-diagnosing-troubleshooting/,Retrieved on Jun. 29, 2016, 37 Pages.

Platon, Oana, "Introduction to Service Fabric Health Monitoring", Retrieved From https://azure.microsoft.com/en-in/documentation/articles/service-fabric-health-introduction/, Retrieved on Jun. 29, 2016, 15 Pages.

"Notice of Allowance Issued in U.S. Appl. No. 15/283,276", dated Nov. 20, 2018, 5 Pages.

"Final Office Action Issued in U.S. Appl. No. 15/283,524", dated Dec. 14, 2018, 21 Pages.

"Office Action Issued in European Patent Application No. 16712178.9", dated Jan. 13, 2020, 6 Pages.

\* cited by examiner

PROVIDING INTERACTIVE PREVIEW OF CONTENT WITHIN COMMUNICATION

BACKGROUND

People interact with computer applications through user interfaces. While audio, tactile, and similar forms of user interfaces are available, visual user interfaces through a display device are the most common form of a user interface. With the development of faster and smaller electronics for computing devices, smaller size devices such as hand-held computers, smart phones, tablet devices, and comparable devices have become common. Such devices execute a wide variety of applications ranging from communication applications to complicated analysis tools. Many such applications display a message and a preview of a content associated with the message through a display and enable users to provide input associated with the applications' operations.

SUMMARY

This summary is provided to introduce a selection of concepts in a simplified form that are further described below in the Detailed Description. This summary is not intended to exclusively identify key features or essential features of the claimed subject matter, nor is it intended as an aid in determining the scope of the claimed subject matter.

Embodiments are directed to an interactive preview of a content within a communication. In some example embodiments, a messaging application may detect an insertion of a link of a content into a message. The content may include media such as a text, a video, an audio, an image, a graphic, an animation, or a combination of media, among others. The message may include an email message, or a text message, among others that may be displayed within a message body pane of a user interface of the messaging application. Information associated with the content may be retrieved from a content provider that stores the content. The information may be displayed in the interactive preview. The information may include a metadata of the content such as a title, a summary, a creation timestamp, and a last edit timestamp, among other attributes associated with the content.

The interactive preview may be generated based on the information. The interactive preview may provide actions to manage the interactive preview and the content. The actions may include an edit action, an add attachment action, a choose-preview-image action, a remove preview action, a remove-preview-image action, and a change permission action, among others. The interactive preview may be inserted into the message in proximity to a location of the insertion of the link. Custom operations associated with the actions that are selected by a user or settings associated with the content may be executed in response to a detection of a transmission of the message.

These and other features and advantages will be apparent from a reading of the following detailed description and a review of the associated drawings. It is to be understood that both the foregoing general description and the following detailed description are explanatory and do not restrict aspects as claimed.

DETAILED DESCRIPTION

Figure 1:
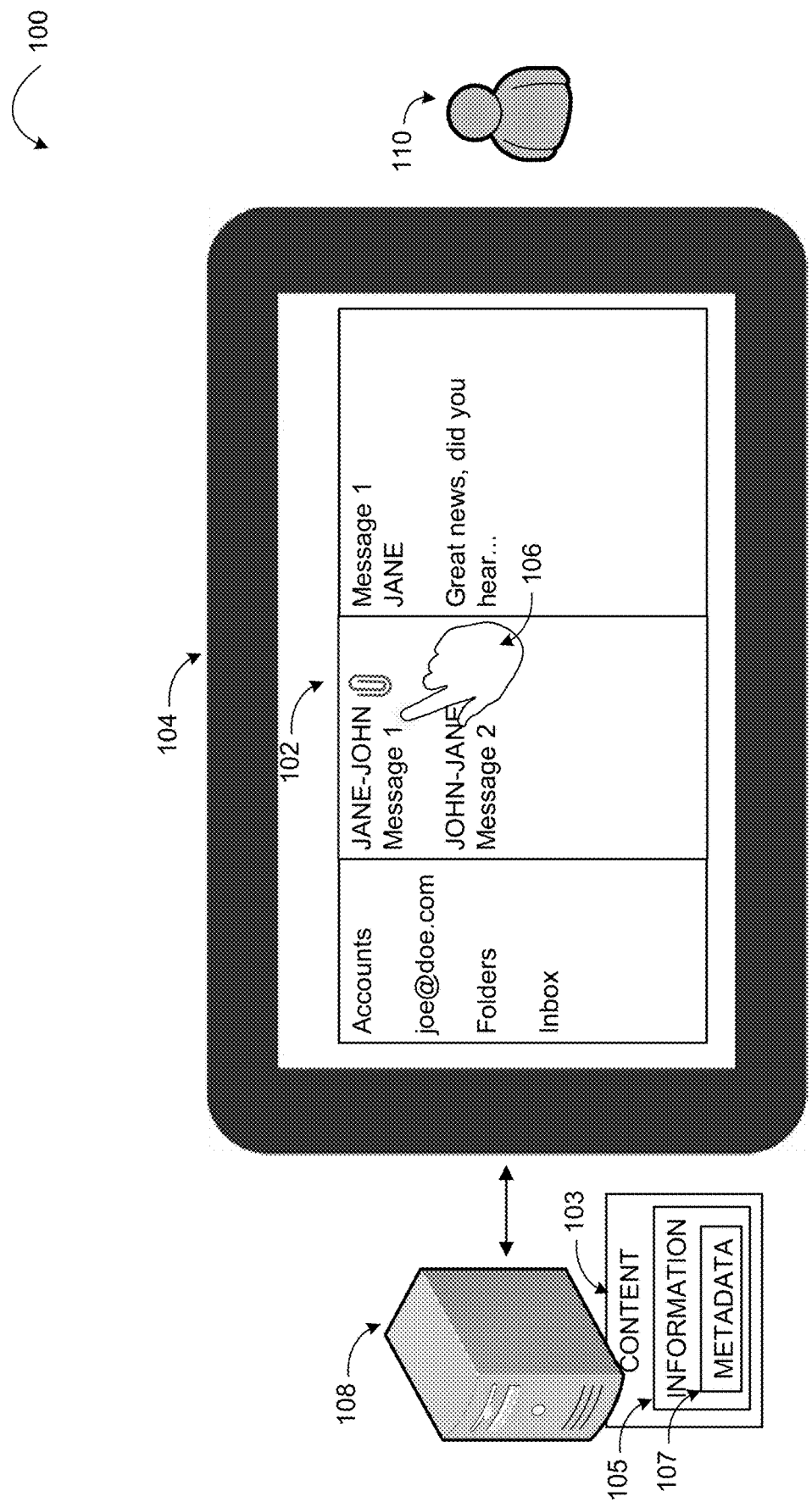
FIG. 1 is a conceptual diagram illustrating an example of providing an interactive preview of a content within a communication, according to embodiments.

As briefly described above, an interactive preview of a content may be provided within a communication by a messaging application. Information associated with the content may be retrieved from a content provider in response to a detection of an insertion of a link of the content into the message. The interactive preview may be generated based on the information. The interactive preview may provide actions to manage the interactive preview and the content. The interactive preview may be inserted into the message in proximity to a location of where the link is inserted. Custom operations associated with the action may be executed in response to a detected transmission of the message.

In the following detailed description, references are made to the accompanying drawings that form a part hereof, and in which are shown by way of illustrations specific embodiments or examples. These aspects may be combined, other aspects may be utilized, and structural changes may be made without departing from the spirit or scope of the present disclosure. The following detailed description is therefore not to be taken in a limiting sense, and the scope of the present invention is defined by the appended claims and their equivalents.

While the embodiments will be described in the general context of program modules that execute in conjunction with an application program that runs on an operating system on a computing device, those skilled in the art will recognize that aspects may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multiprocessor systems, microprocessor-based or programmable consumer electronics, minicomputers, mainframe computers, and comparable computing devices. Embodiments may also be practiced in distributed computing environments where tasks are performed by remote processing devices that are linked through a communications network. In a distributed computing environment, program modules may be located in both local and remote memory storage devices.

Embodiments may be implemented as a computer-implemented process (method), a computing system, or as an article of manufacture, such as a computer program product or computer readable media. The computer program product may be a computer storage medium readable by a computer system and encoding a computer program that comprises instructions for causing a computer or computing system to perform example process(es). The computer-readable storage medium is a computer-readable memory device. The computer-readable memory device includes a hardware device that includes a hard disk drive, a solid state drive, a compact disk, and a memory chip, among others. The computer-readable storage medium can for example be implemented via one or more of a volatile computer memory, a non-volatile memory, a hard drive, and a flash drive.

Throughout this specification, the term "platform" may be a combination of software and hardware components to provide an interactive preview of a content within a communication. Examples of platforms include, but are not limited to, a hosted service executed over a plurality of servers, an application executed on a single computing device, and comparable systems. The term "server" generally refers to a computing device executing one or more software programs typically in a networked environment. However, a server may also be implemented as a virtual server (software programs) executed on one or more computing devices viewed as a server on the network. More detail on these technologies and example embodiments may be found in the following description.

FIG. 1 is a conceptual diagram illustrating an example of providing an interactive preview of a content within a communication, according to embodiments.

In a diagram 100, a computing device 104 may execute a messaging application 102. The computing device 104 may include a tablet device, a laptop computer, a desktop computer, and a smart phone, among others. The computing device 104 may display the messaging application 102 to a user 110. The user 110 may be allowed to interact with the messaging application 102 through an input device or touch enabled display component of the computing device 104. The computing device 104 may include a display device such as the touch enabled display component, and a monitor, among others to provide a user interface of the messaging application 102 to the user 110.

The messaging application 102 may detect an insertion of a link of a content into a message through an input 106 by the user 110. The content may include media such as a text, a video, an audio, an image, a graphic, an animation, or a combination of media, among others. The messaging application 102 may retrieve information associated with the content from a content provider such as a server 108. The information may include a metadata of the content. An interactive preview may be generated that includes actions, based on the metadata. The interactive preview may be presented to the user 110. Custom operations associated with the actions that are selected by the user 110 or settings associated with the content may be executed in response to a detection of a transmission of the message. The user 110 may interact with the messaging application 102 with a keyboard based input, a mouse based input, a voice based input, a pen based input, and a gesture based input, among others. The gesture based input may include one or more touch-based actions such as a touch action, a swipe action, and a combination of each, among others.

The messaging application 102 may retrieve the metadata of the content from a local source such as a storage media, a memory, a hard disk drive, and a solid state drive, among others that store the content. The metadata may also be received from a content provider such as the server 108 that provides the content. An example of a content provider may include a document management server, a media management server, or a web server, among others.

While the example system in FIG. 1 has been described with specific components including the computing device 104, the messaging application 102, embodiments are not limited to these components or system configurations and can be implemented with other system configuration employing fewer or additional components.

Figure 2:
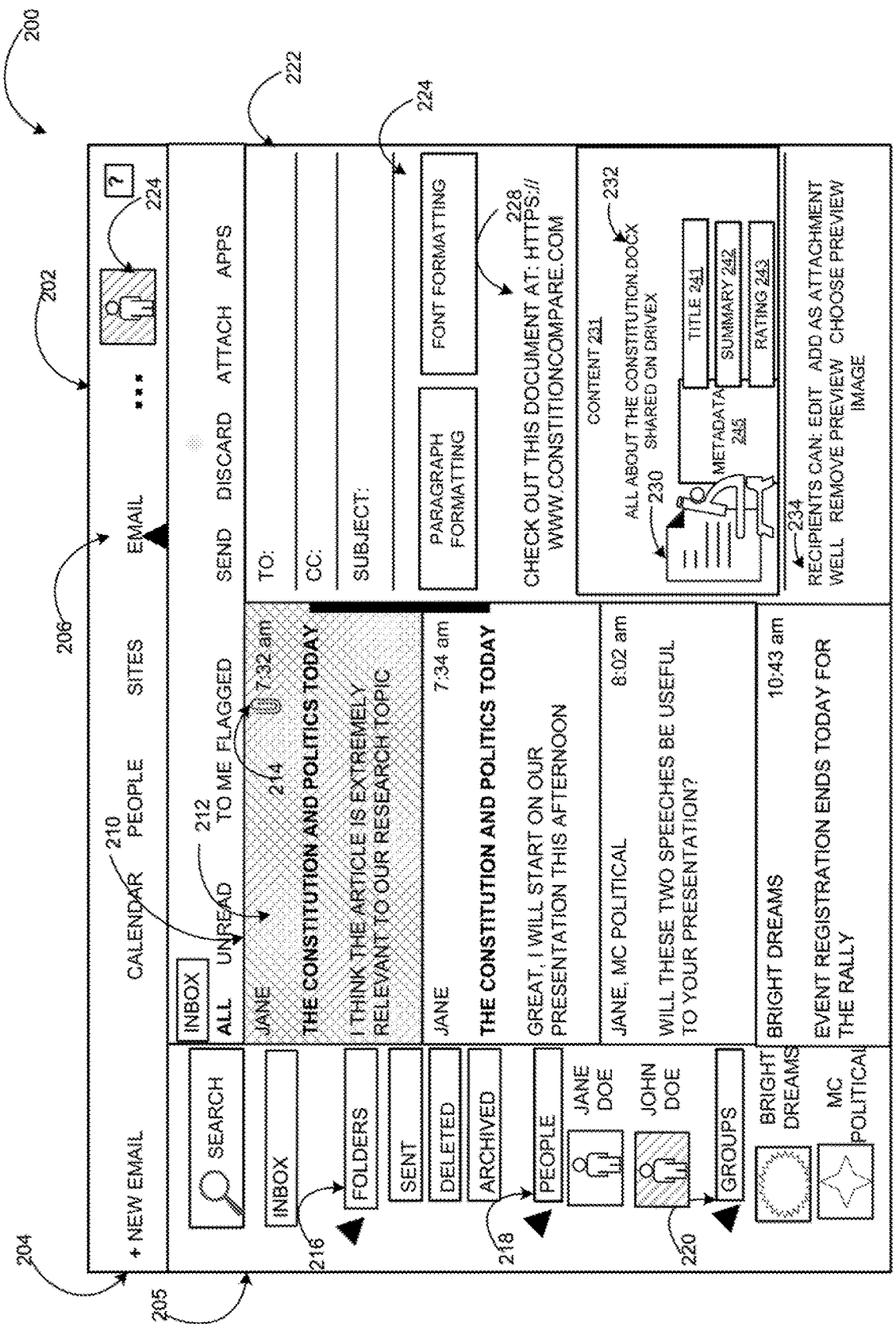
FIG. 2 illustrates an example of an interactive preview of a content provided within a communication, according to embodiments.

FIG. 2 illustrates an example of an interactive preview of a content provided within a communication, according to embodiments.

In a diagram 200, a messaging application 202 may display a user interface to display summary of messages and the messages. The user interface may include a menu pane 204 that includes controls to switch between communication user interfaces such as an email user interface 206, a calendar user interface, or a contacts user interface, among others. The menu pane 204 may also display a user control 224 that provides an operation to access attributes associated with a user account that receives the messages.

The messaging application 202 may also display a navigation pane 205 that provides controls to manage categories where the messages may be cataloged. A folders control 216 may include operations to provide additional controls, which correspond to folders such as "sent," "deleted," and "archived," among others in which the messages may be stored. A people control 218 may include operations to display summaries of messages based on a selected contact within a summary pane 210. A groups control 220 may include operations to display summaries of messages based on a selected group, within the summary pane 210.

The summary pane 210 may display summaries of messages. A message summary 212 may display identifying information such as a subject, a sender, and a sample text, among others of a corresponding message. The message summary 212 may also provide an attachment notification 214 to indicate that the message may include an attachment such as a content 211. The content 231 may include an audio file, a video file, an image file, a text file, and an animation file, among others.

A message pane 222 may display a body of a message 224 that corresponds to a selected message summary 212 on the summary pane 210. The message pane 222 may also display a reply message as the message 224 in response to a user action to reply to the message 224 associated with the message summary 212.

A user may insert a link 228 to the content 231 into the message 224. The messaging application 202 may retrieve a metadata 245 of the content 231 from a content provider that stores the content 231. The metadata 245 may include a preview image 230, a sample 232 of a text of the content 231. The sample 232 may include a title 241 of the content 231, and a summary 242 of the content 231, among other identifiers associated with the content 231.

An interactive preview may be generated based on the metadata 245. The interactive preview may include the preview image 230 and the sample 232. The interactive preview may also include actions 234 to manage the interactive preview and the content. Custom operations associated with the actions 234 that are selected by the user or settings associated with the content may be executed in response to a detection of a transmission of the message 224. Settings associated with the content may include settings that are associated with the content or an attachment associated with the message 224. An example of the settings may include permission settings associated with the content 231, the attachment, or the message 224. The custom operations may transmit changes to the metadata 245 to the content provider to allow the content provider to synchronize the metadata 245 and the content 231 with changes to the metadata 245.

Figure 3:
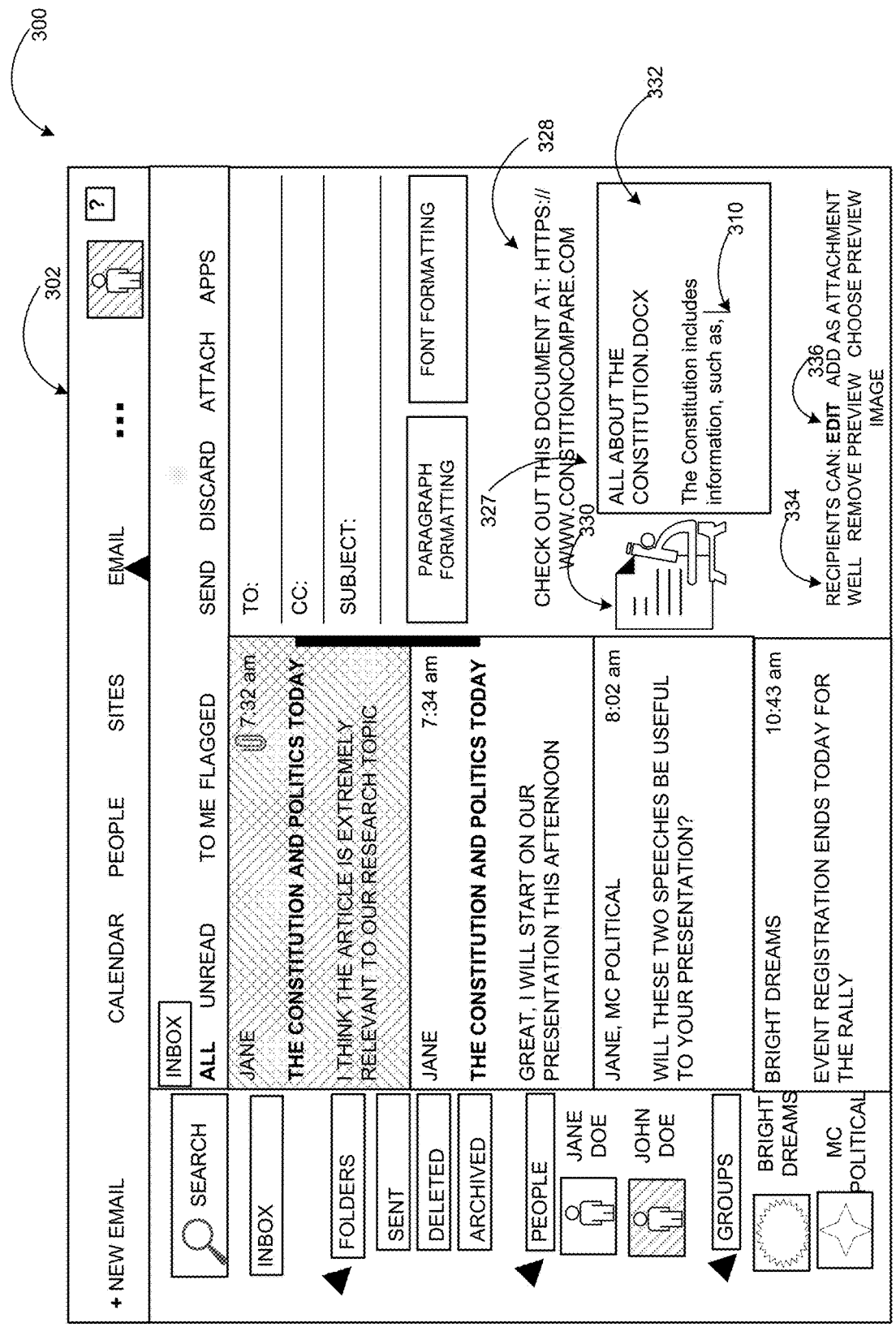
FIG. 3 illustrates an example of an edit action used to edit a sample of a text of the content on an interactive preview of the content provided within a communication, according to embodiments.

FIG. 3 illustrates an example of an edit action used to edit a sample of a text of the content on an interactive preview of the content provided within a communication, according to embodiments.

In a diagram 300, a messaging application 302 may provide an edit action 336 to allow editing of a sample of a text of a content displayed in an interactive preview 327 of the content, within a message. The interactive preview 327 may be generated from information of a content associated with a link 328 displayed in the message. The information may include a metadata of the content.

The interactive preview 327 may be inserted in proximity to the link 328. In an example scenario, the interactive preview 327 may be inserted adjacent to the link 328. In another example scenario, the interactive preview 327 may be inserted below the link 328. The interactive preview 327 may include a sample of the text of the content such as a title of the content and a summary of the content. The interactive preview 327 may also include a preview image 330 of the content retrieved from the metadata.

The messaging application 302 may provide actions 334 that includes the edit action 336. In response to a detection of an activation of the edit action, controls may be provided to edit the sample 310. The controls may include font formatting controls, paragraph formatting controls, text insertion controls, and text deletion controls, among others.

Detected changes to the sample 310 may be inserted into the metadata. The metadata may be transmitted to the content provider to allow the content provider to synchronize the metadata with the changes and apply the changes to the content, as well. The updated metadata may be transmitted to the content provider in response to a detection of a transmission of the message that includes the interactive preview. The updated metadata may also be transmitted to the content provider based on a repeating duration such as every second, every other second, every minute, every hour, among others. Alternatively, the updated metadata may be transmitted to the content provider on demand based on a variety of system and user configurable attributes.

Figure 4:
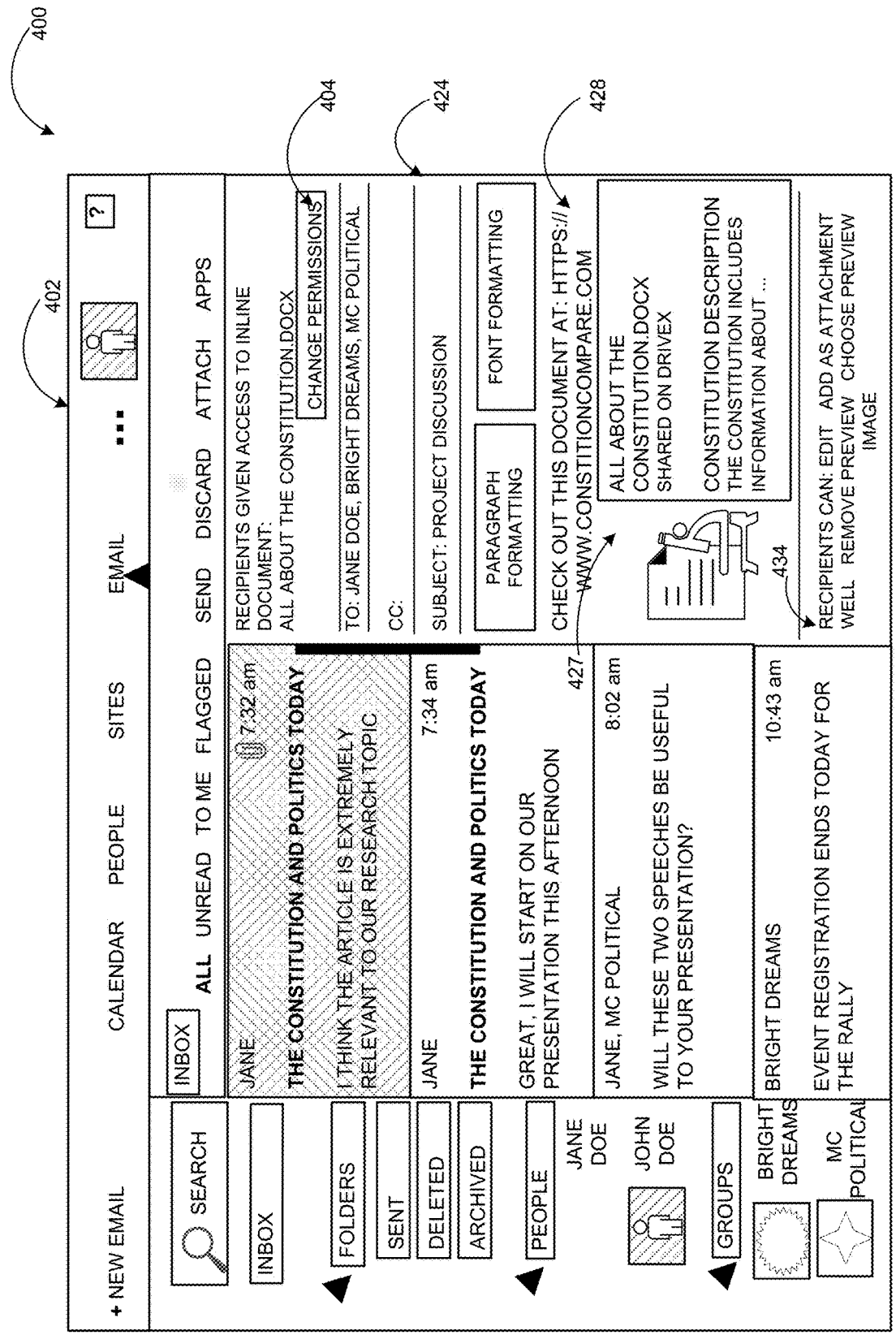
FIG. 4 illustrates an example of a change permission action used to manage an interactive preview of a content provided within a communication, according to embodiments.

FIG. 4 illustrates an example of a change permission action used to manage an interactive preview of a content provided within a communication, according to embodiments.

In a diagram 400, a messaging application 402 may generate and display an interactive preview 427 of a content associated with a link 428 of the content inserted into a message 424. The messaging application may provide a change permissions action 404 to allow a user of the messaging application 402 to restrict an access to the interactive preview 427 and the content associated with the interactive preview 427. The user may restrict the access to recipients 434 of the message 424.

The user may be allowed to select the recipients 434 from the "To:" control of a message pane that lists the recipients. The selected recipients may be assigned permission setting(s) for the interactive preview 427 and the content. The permission setting may include a read-only setting and a read or edit setting, among others. The permission setting(s) may be captured based on selections by the user.

The permission setting for the interactive preview 427 may be different from the permission setting for the content. In an example scenario, the user may select a read-only setting for the interactive preview 427 while selecting a read or edit setting for the content. The permission setting(s) may be inserted into the metadata. The metadata may be transmitted to the content provider to allow the content provider to update the metadata of the content with the permission setting(s).

Figure 5:
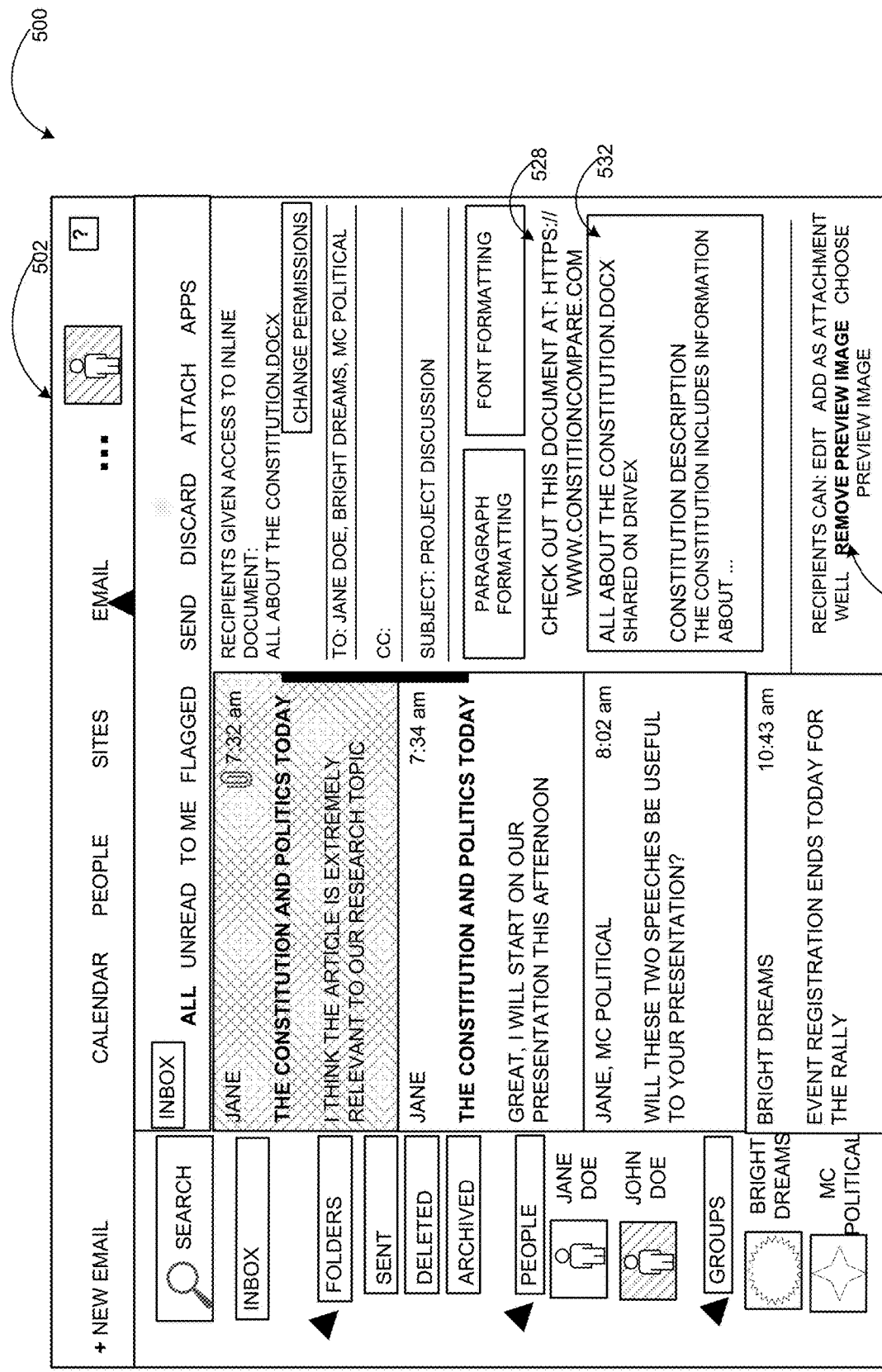
FIG. 5 illustrates an example of a remove-preview-image action used to remove a preview image of the content on an interactive preview of the content provided within a communication, according to embodiments.

FIG. 5 illustrates an example of a remove-preview-image action used to remove a preview image of the content on an interactive preview of the content provided within a communication, according to embodiments.

In a diagram 500, a messaging application 502 may display a remove-preview-image action 536 to remove a preview image of a content associated with a link 528. In response to a detection of an activation of the remove-preview-image action 536, the messaging application 502 may remove a preview image of the content from the interactive preview displayed in proximity to the link 528. A sample pane may be expanded to display a sample 532 of text of the content in a larger area that overlaps a previous area occupied by the removed preview image of the content.

Figure 6:
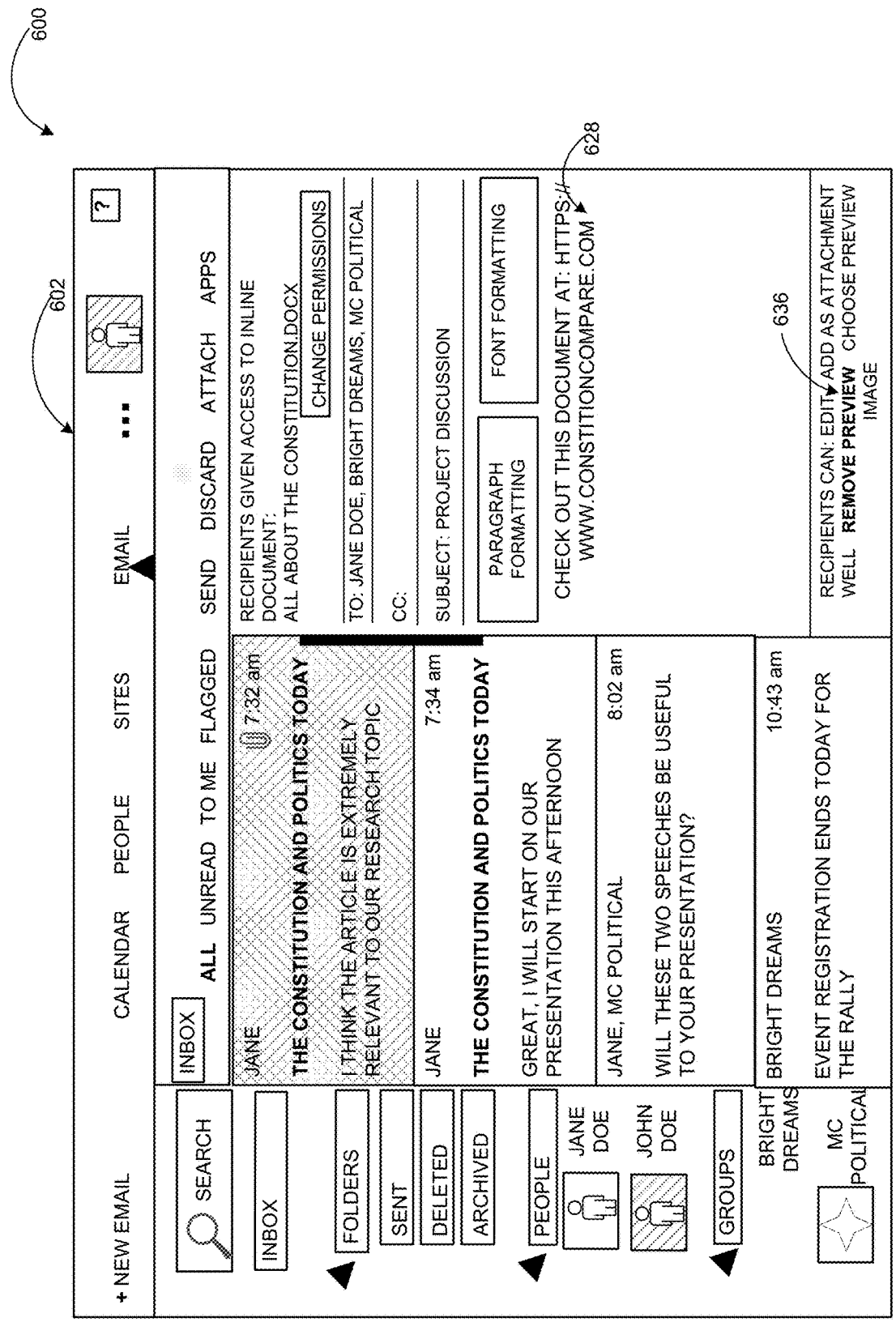
FIG. 6 illustrates an example of a remove preview action used to remove an interactive preview of the content provided within a communication, according to embodiments.

FIG. 6 illustrates an example of a remove preview action used to remove an interactive preview of the content provided within a communication, according to embodiments.

In a diagram 600, a messaging application 602 may display a remove preview action 636 to remove an interactive preview of a content associated with a link 628. The interactive preview may be displayed in proximity to the link 628 prior to the activation of the remove preview action 636. In response to a detection of an activation of the remove preview action 636, the interactive preview may be removed. The actions may be adjusted to provide custom operations that reflect the removed status of the interactive preview. In an example scenario, the actions that manage the interactive preview may be removed. Actions that add a new interactive preview of a new content associated with the link 628 may be displayed.

Figure 7:
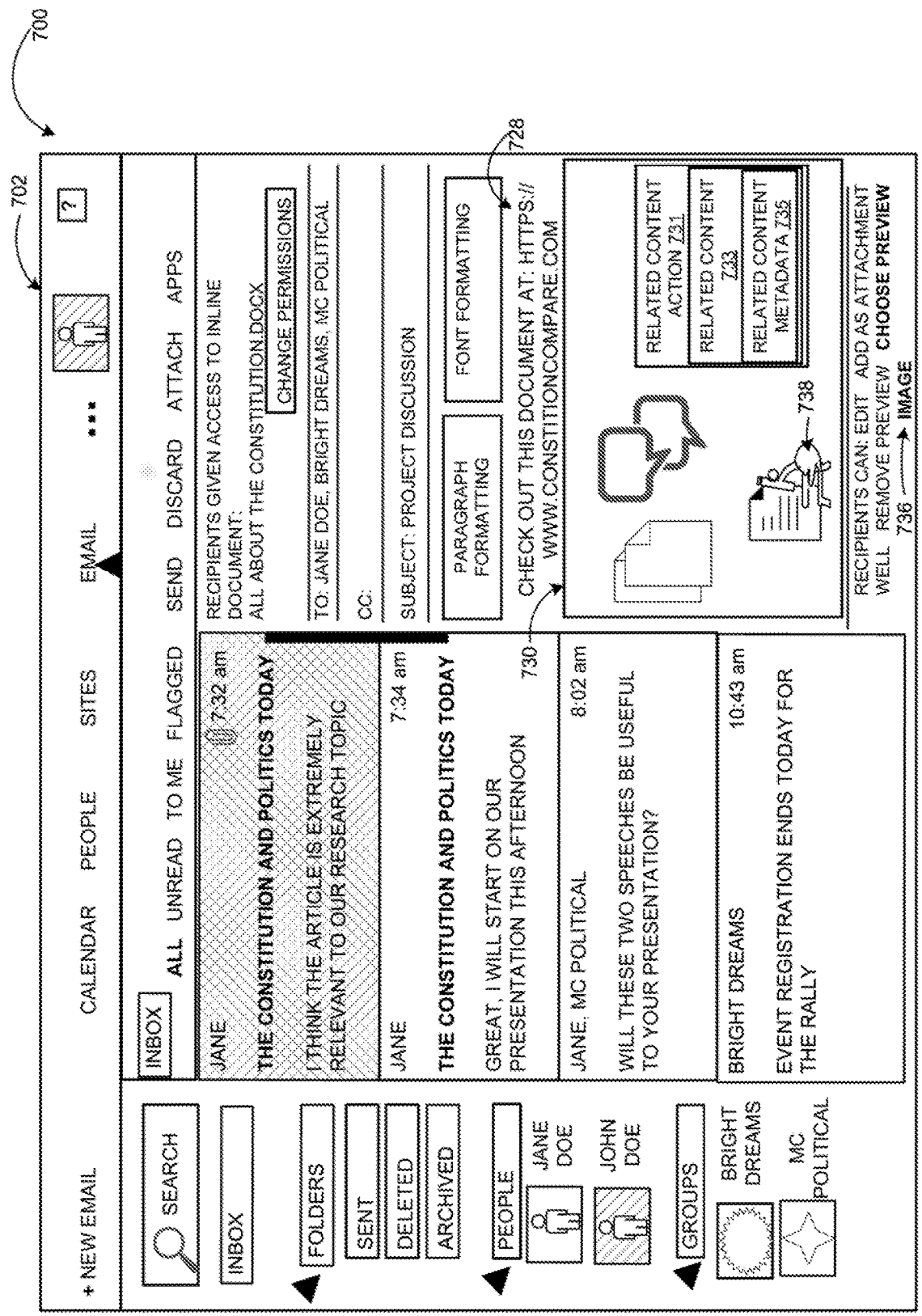
FIG. 7 illustrates an example of a choose-preview-image action used to select a preview image of the content on an interactive preview of the content provided within a communication, according to embodiments.

FIG. 7 illustrates an example of a choose-preview-image action used to select a preview image of the content on an interactive preview of the content provided within a communication, according to embodiments.

In a diagram 700, a messaging application 702 may display a choose-preview-image action 736 to allow a user to select a preview image associated with a content of a link 728. In response to an activation of the choose-preview-image action 736, a content type of the content may be detected from the metadata. Preview images associated with the content type may be located from preview image providers. An example of a preview image provider may include the content provider.

The preview images may be displayed on a preview image pane 730 to allow a user to select one of the preview images for inclusion in the interactive preview. A selection 738 of one of the images may be detected. The selected preview image may be included in the interactive preview.

A related content action 731 may also be displayed to locate and display a related content section in the interactive preview. In response to a detection of an activation of the related content action 731, the content provider may be queried to retrieve related content metadata of related content(s) 733 associated with the content. The related content metadata 745 may include a title and a summary, among other identifiers of the related content(s) 733.

In response to receiving the related content metadata, a related content section may be generated from the related content metadata. The related content section may be inserted into the interactive preview.

An add as attachment action may be provided to allow a user to insert the content referred by the link 728 as an attachment into the message. The attachment of the content may include any edits that changed the content. Operations to attach the content may include a retrieval of the content from the content provider, a storage of the content in a format associated with an attachment associated with the message, an insertion of the attachment into the message, among others. The operations associated with the add as attachment action may be executed in response to a detection of a transmission of the message or in response to an activation of the add as attachment action.

An edit title action may be provided to allow the user to edit a title of the content referred by the link 728. The title of the content displayed on the interactive preview may be changed in response to a detection of the user activating the edit title action and editing the title of the content.

A copy to action may be provided to allow the user to copy the content from a current storage location (such as the content provider) to a new storage location (such as a local storage). The content may be copied to the new storage location in response to a detection of a transmission of the message or in response to an activation of the copy to action.

The technical advantage of providing an interactive preview of a content within a communication may include improved usability of user interfaces that present a preview of content within a message while allowing a user to update the interactive preview and the content through the interactive preview compared to legacy messaging solutions.

The example scenarios and schemas in FIG. 1 through 7 are shown with specific components, data types, and configurations. Embodiments are not limited to systems according to these example configurations. Providing an interactive preview of a content within a communication may be implemented in configurations employing fewer or additional components in applications and user interfaces. Furthermore, the example schema and components shown in FIG. 1 through 7 and their subcomponents may be implemented in a similar manner with other values using the principles described herein.

Figure 8:
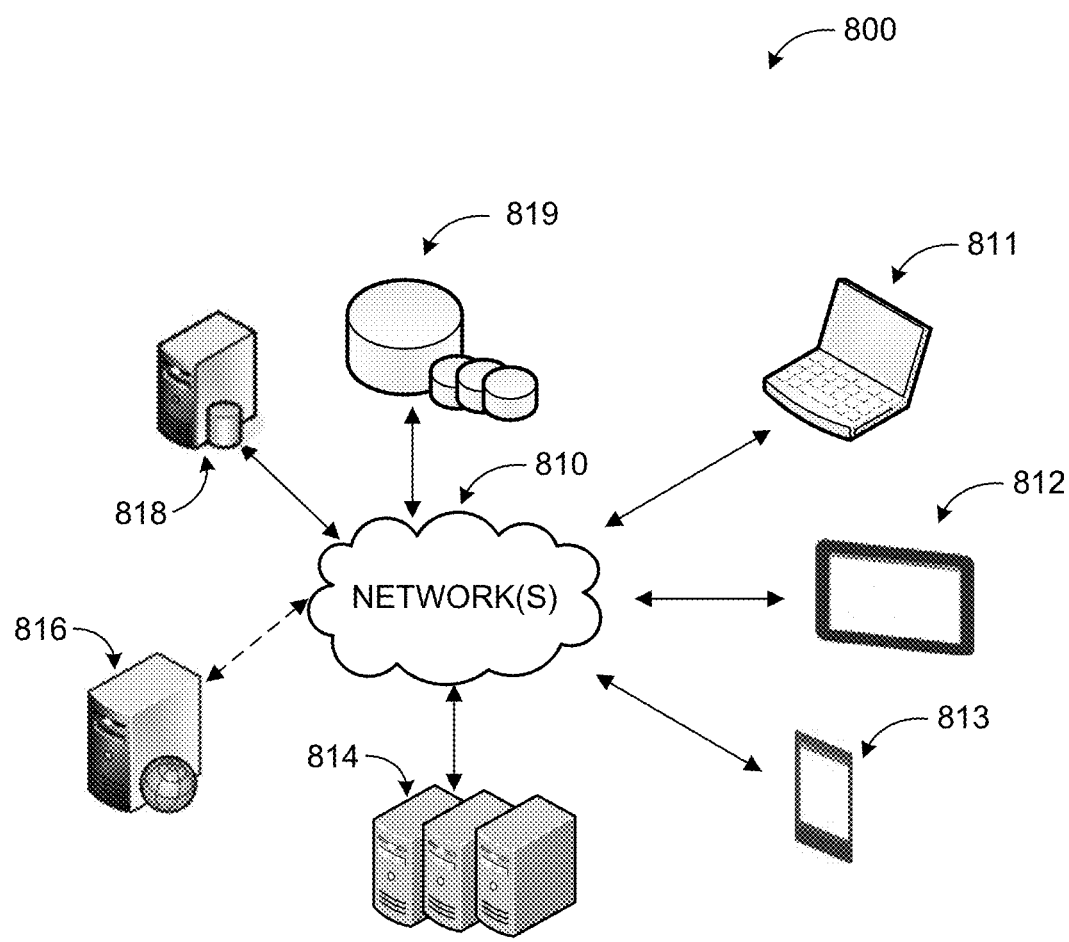
FIG. 8 is a simplified networked environment, where a system according to embodiments may be implemented.

FIG. 8 is an example networked environment, where embodiments may be implemented. A messaging application configured to provide an interactive preview of a content within a communication may be implemented via software executed over one or more servers 814 such as a hosted service. The platform may communicate with client applications on individual computing devices such as a smart phone 813, a mobile computer 812, or desktop computer 811 ('client devices') through network(s) 810.

Client applications executed on any of the client devices 811-813 may facilitate communications via application(s) executed by servers 814, or on individual server 816. A messaging application may retrieve metadata associated with a content in response to a detection of an insertion of a link of the content into a message. An interactive preview of the content may be generated based on the metadata. The interactive preview (that provides actions to manage the interactive preview and the content) may be inserted to the message in proximity to the link. Custom operations of the operations may be executed in response to a transmission of the message. The messaging application may store data associated with content in data store(s) 819 directly or through database server 818.

Network(s) 810 may comprise any topology of servers, clients, Internet service providers, and communication media. A system according to embodiments may have a static or dynamic topology. Network(s) 810 may include secure networks such as an enterprise network, an unsecure network such as a wireless open network, or the Internet. Network(s) 810 may also coordinate communication over other networks such as Public Switched Telephone Network (PSTN) or cellular networks. Furthermore, network(s) 810 may include short range wireless networks such as Bluetooth or similar ones. Network(s) 810 provide communication between the nodes described herein. By way of example, and not limitation, network(s) 810 may include wireless media such as acoustic, RF, infrared and other wireless media.

Many other configurations of computing devices, applications, data sources, and data distribution systems may be employed to provide an interactive preview of a content within a communication. Furthermore, the networked environments discussed in FIG. 8 are for illustration purposes only. Embodiments are not limited to the example applications, modules, or processes.

Figure 9:
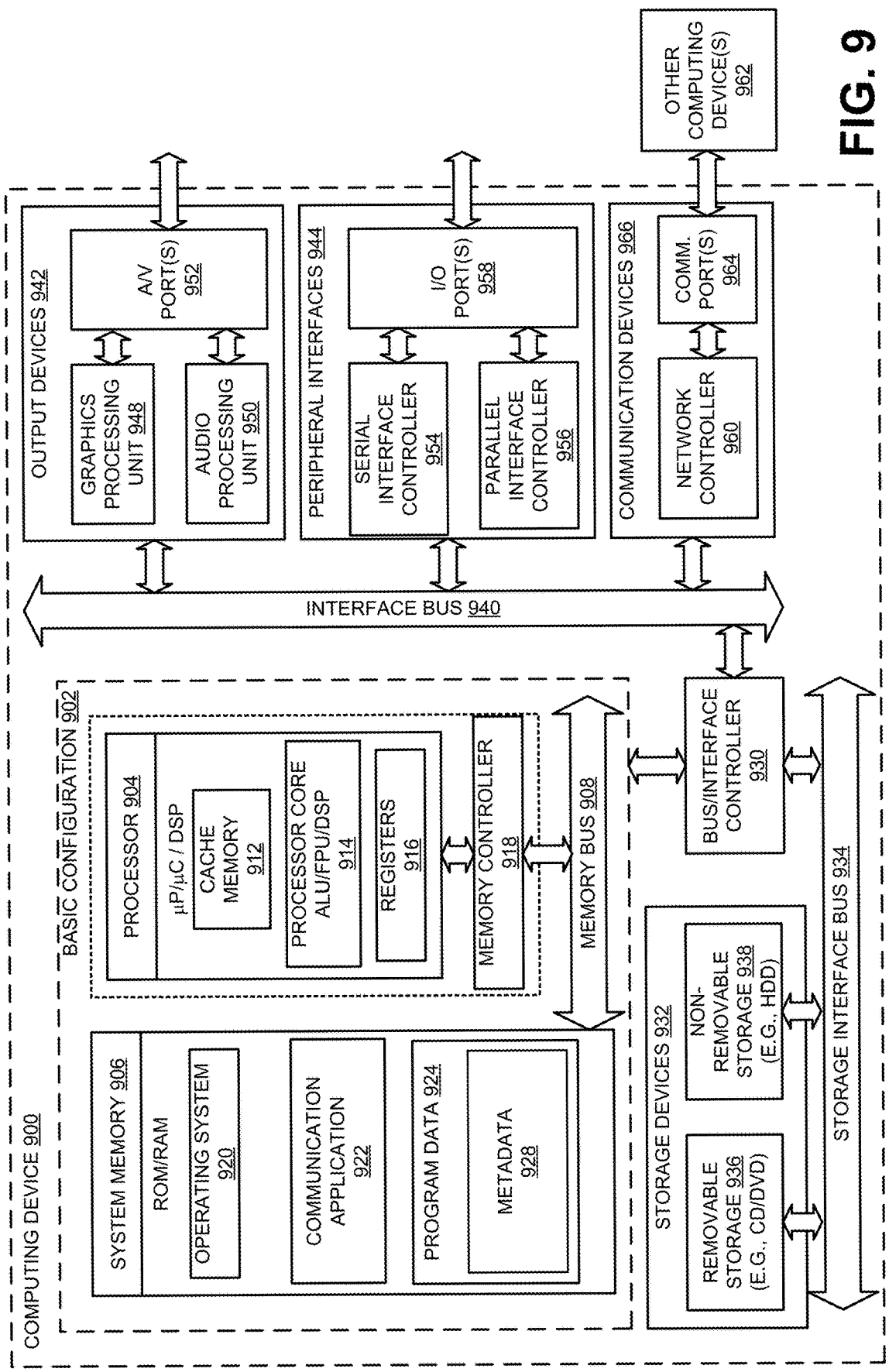
FIG. 9 illustrates a general purpose computing device, which may be configured to provide an interactive preview of a content within a communication.

FIG. 9 illustrates a general purpose computing device, which may be configured to provide an interactive preview of a content within a communication, arranged in accordance with at least some embodiments described herein.

For example, the computing device 900 may be used to provide an interactive preview of a content within a communication. In an example of a basic configuration 902, the computing device 900 may include one or more processors 904 and a system memory 906. A memory bus 908 may be used for communication between the processor 904 and the system memory 906. The basic configuration 902 may be illustrated in FIG. 9 by those components within the inner dashed line.

Depending on the desired configuration, the processor 904 may be of any type, including, but not limited to, a microprocessor (µP), a microcontroller (µC), a digital signal processor (DSP), or any combination thereof. The processor 904 may include one more levels of caching, such as a level cache memory 912, a processor core 914, and registers 916. The processor core 914 may include an arithmetic logic unit (ALU), a floating point unit (FPU), a digital signal processing core (DSP Core), or any combination thereof. A memory controller 918 may also be used with the processor 904, or in some implementations, the memory controller 918 may be an internal part of the processor 904.

Depending on the desired configuration, the system memory 906 may be of any type including but not limited to volatile memory (such as RAM), non-volatile memory (such as ROM, flash memory, etc.), or any combination thereof. The system memory 906 may include an operating system 920, a messaging application 922, and a program data 924. The messaging application 922 may retrieve metadata associated with a content in response to a detection of an insertion of a link of the content into a message. An interactive preview of the content may be generated based on the metadata. The interactive preview (that provides actions to manage the interactive preview and the content)

may be inserted to the message in proximity to the link. Custom operations of the operations may be executed in response to a transmission of the message. Components of the messaging application 922 (such as a user interface) may also be displayed on a display device associated with the computing device 900. An example of the display device may include a hardware screen that may be communicatively coupled to the computing device 900. The display device may include a touch-based device that detects gestures such as a touch action. The display device may also provide feedback in response to detected gestures (or any other form of input) by transforming a user interface of the messaging application 922, displayed by the touch-based device. The program data 924 may also include, among other data, metadata 928, or the like, as described herein. The metadata 928 may include a preview image, a title of the content, and a summary of the content, among others.

The computing device 900 may have additional features or functionality, and additional interfaces to facilitate communications between the basic configuration 902 and any desired devices and interfaces. For example, a bus/interface controller 930 may be used to facilitate communications between the basic configuration 902 and one or more data storage devices 932 via a storage interface bus 934. The data storage devices 932 may be one or more removable storage devices 936, one or more non-removable storage devices 938, or a combination thereof. Examples of the removable storage and the non-removable storage devices may include magnetic disk devices, such as flexible disk drives and hard-disk drives (HDD), optical disk drives such as compact disk (CD) drives or digital versatile disk (DVD) drives, solid state drives (SSD), and tape drives, to name a few. Example computer storage media may include volatile and nonvolatile, removable, and non-removable media implemented in any method or technology for storage of information, such as computer-readable instructions, data structures, program modules, or other data.

The system memory 906, the removable storage devices 936, and the non-removable storage devices 938 may be examples of computer storage media. Computer storage media may include, but may not be limited to, RAM, ROM, EEPROM, flash memory or other memory technology, CD-ROM, digital versatile disks (DVD), solid state drives, or other optical storage, magnetic cassettes, magnetic tape, magnetic disk storage or other magnetic storage devices, or any other medium which may be used to store the desired information and which may be accessed by the computing device 900. Any such computer storage media may be part of the computing device 900.

The computing device 900 may also include an interface bus 940 for facilitating communication from various interface devices (for example, one or more output devices 942, one or more peripheral interfaces 944, and one or more communication devices 966) to the basic configuration 902 via the bus/interface controller 930. Some of the example output devices 942 may include a graphics processing unit 948 and an audio processing unit 950, which may be configured to communicate to various external devices, such as a display or speakers via one or more A/V ports 952. One or more example peripheral interfaces 944 may include a serial interface controller 954 or a parallel interface controller 956, which may be configured to communicate with external devices, such as input devices (for example, keyboard, mouse, pen, voice input device, touch input device, etc.) or other peripheral devices (for example, printer, scanner, etc.) via one or more I/O ports 958. An example communication device 966 may include a network controller 960, which may be arranged to facilitate communications with one or more other computing devices 962 over a network communication link via one or more communication ports 964. The one or more other computing devices 962 may include servers, client equipment, and comparable devices.

The network communication link may be one example of a communication media. Communication media may be embodied by computer-readable instructions, data structures, program modules, or other data in a modulated data signal, such as a carrier wave or other transport mechanism, and may include any information delivery media. A "modulated data signal" may be a signal that has one or more of the modulated data signal characteristics set or changed in such a manner as to encode information in the signal. By way of example, and not limitation, communication media may include wired media such as a wired network or direct-wired connection, and wireless media such as acoustic, radio frequency (RF), microwave, infrared (IR), and other wireless media. The term computer-readable media, as used herein, may include both storage media and communication media.

The computing device 900 may be implemented as a part of a general purpose or specialized server, mainframe, or similar computer, which includes any of the above functions. The computing device 900 may also be implemented as a personal computer including both laptop computer and non-laptop computer configurations.

Example embodiments may also include methods to provide an interactive preview of a content within a communication. These methods may be implemented in any number of ways, including the structures described herein. One such way may be by machine operations, using devices of the type described in the present disclosure. Another optional way may be for one or more of the individual operations of the methods to be performed in conjunction with one or more human operators performing some of the operations while other operations may be performed by machines. These human operators need not be co-located with each other, but each may be with a machine that performs a portion of the program. In other examples, the human interaction may be automated such as by pre-selected criteria that may be machine automated.

Figure 10:
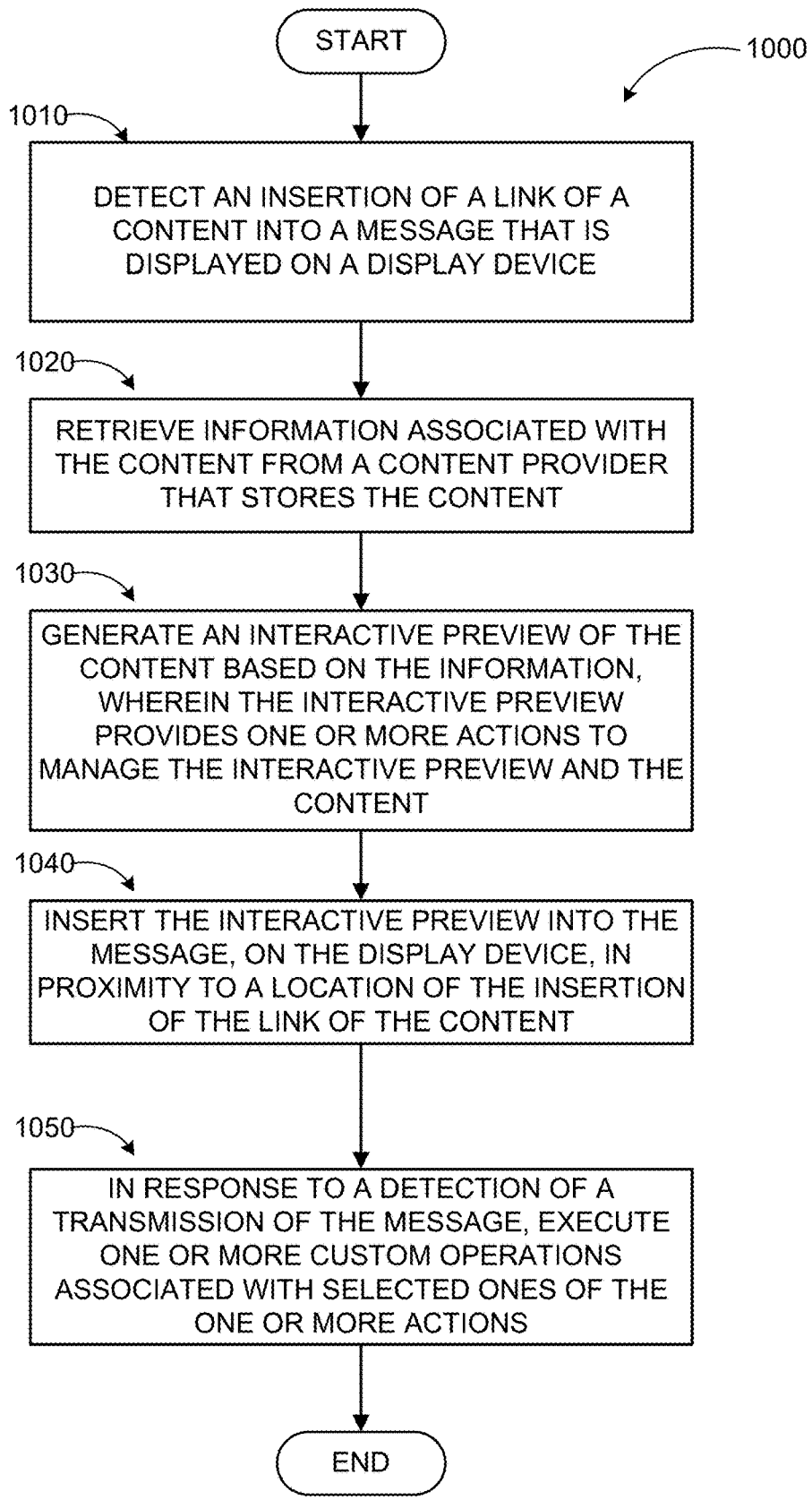
FIG. 10 illustrates a logic flow diagram for a process to provide an interactive preview of a content within a communication, according to embodiments.

FIG. 10 illustrates a logic flow diagram for a process to provide an interactive preview of a content within a communication, according to embodiments. Process 1000 may be implemented on a messaging application.

Process 1000 begins with operation 1010, where an insertion may be detected of a link of a content into a message that is displayed on a display device. Information such as metadata associated with the content may be retrieved from a content provider (that stores the content) at operation 1020. The metadata may include a preview image, a title of the content, and a summary of the content, among other identifier information associated with the content. At operation 1030, an interactive preview of the content may be generated based on the information. The interactive preview may provide actions to manage the interactive preview and the content. The interactive preview may be inserted into the message, on the display device, in proximity to a location of the insertion of the link at operation 1040. The interactive preview may be placed in proximity to the link. At operation 1050, custom operations associated with the actions (that are selected by a user) may be executed in response to a detection of a transmission of the message.

The operations included in process 1000 are for illustration purposes. A messaging application according to embodiments may be implemented by similar processes with fewer or additional steps, as well as in different order of operations using the principles described herein.

According to some examples, a computing device to provide an interactive preview of a content within a communication may be described. The computing device may include a display device, a memory, and a processor coupled to the memory and the display device. The processor may execute a messaging application. The messaging application may be configured to detect an insertion of a link to the content into the message that is displayed on the display device, retrieve information associated with the content from a content provider that stores the content, generate the interactive preview of the content based on the information, where the interactive preview provides one or more actions to manage the interactive preview and the content, insert the interactive preview into the message in proximity to a location of the insertion of the link of the content, and in response to a detection of a transmission of the message, execute one or more operations associated with selected ones of the one or more actions.

According to other examples, the messaging application may be further configured to retrieve metadata of the content as the information, update the metadata of the content with one or more changes resulting from execution of the one or more custom operations, and transmit the updated metadata to the content provider to allow the content provider to synchronize the metadata of the content with the one or more changes. The one or more actions may include: an edit action, an add attachment action, a choose-preview-image action, a remove preview action, a remove-preview-image action, and a change permission action. The interactive preview may be displayed adjacent to the location of the insertion of the link of the content, within the message.

According to further examples, the messaging application may be further configured to detect through the information that the content includes text, select a sample of the text to insert into the interactive preview, where the sample of the text includes a title of the content and a summary of the content, provide an edit action within the interactive preview to allow a user to edit the sample, detect a selection of the edit action by the user, provide one or more controls on the interactive preview to edit the sample, detect one or more changes to the sample within the interactive preview as edited by the user, and transmit the one or more changes to the content provider to allow the content provider to synchronize the text of the content with the one or more changes.

According to other examples, the messaging application may be further configured to extract a preview image of the content from the metadata and display the preview image in the interactive preview. The messaging application may be further configured to detect a selection of a choose-preview-image action by a user, detect a content type of the content from the information, and locate one or more preview images associated with the content type from one or more preview image providers that includes the content provider, display the one or more preview images to allow the user to select one of the one or more preview images to be included in the interactive preview, detect a selection of one of the one or more preview images, and display the selected preview image in the interactive preview. The messaging application may be further configured to detect a selection of a remove-preview-image action by a user and remove a preview image of the content that is displayed in the interactive preview.

According to some examples, a method that is executed on a computing device to provide an interactive preview of a content within a communication may be described. The method may include detecting an insertion of a link to the content into a message, retrieving metadata associated with the content from a content provider that stores the content, generating the interactive preview of the content based on the metadata, where the interactive preview provides one or more actions to manage the interactive preview and the content, inserting the interactive preview into the message in proximity to a location of the insertion of the link, and in response to a detection of a transmission of the message, executing one or more custom operations associated with selected ones of the one or more actions.

According to other examples, the method may further include detecting a selection of a remove-preview action and removing the interactive preview. The method may further include detecting a selection of a rating action, capturing a rating 243 associated with the content 231 as rated by the user, where the rating 243 includes one or more of: a positive rating, a negative rating, and a neutral rating associated with the content 231, displaying the rating 243 within the interactive preview, inserting the rating 243 into the metadata 245, and transmitting the metadata 245 to the content 231 provider to allow the content provider to update the metadata 245 of the content 231 with the rating 243.

According to further examples, the method may further include detecting a selection of a change permission action, capturing a permission setting associated with a receiver of the message to restrict an access of the receiver to the content as provided by the user, inserting the permission setting into the metadata, and transmitting the metadata to the content provider to allow the content provider to update the metadata of the content with the permission setting. The method may further include detecting a selection of a related content action as the one or more actions, querying the content provider to retrieve one or more related content metadata of one or more related contents associated with the content, where the one or more related content metadata include a title and a summary of the one or more related contents, generating a related content section from the one or more related content metadata, and inserting the related content section into the interactive preview.

According to some examples, a computer-readable memory device with instructions stored thereon to provide an interactive preview of a content within a communication may be described. The instructions may include actions that are similar to method described above.

According to some examples, a means to provide an interactive preview of a content within a communication may be described. The means to provide an interactive preview of a content within a communication may include a means to detect an insertion of a link to the content into the message that is displayed on the display device, a means to retrieve information associated with the content from a content provider that stores the content, a means to generate the interactive preview of the content based on the information, where the interactive preview provides one or more actions to manage the interactive preview and the content, a means to insert the interactive preview into the message in proximity to a location of the insertion of the link of the content, and a means to execute one or more operations associated with selected ones of the one or more actions in response to a detection of a transmission of the message.

The above specification, examples and data provide a complete description of the manufacture and use of the composition of the embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and embodiments.

What is claimed is:

1. A computing device to provide an interactive preview within a communication, the computing device comprising:
a memory;
a processor coupled to the memory wherein the processor in conjunction with instructions stored in the memory, is configured to:
    detect an insertion of a link into a message during composition of the message;
    in response to detecting the insertion of the link into the message, retrieve, prior to transmitting the message, metadata associated with the link from a content provider;
    generate, prior to transmitting the message, the interactive preview for the content associated with the link based on the metadata, wherein the interactive preview includes a selectable action to allow a user to select, prior to transmitting the message, a preview image associated with the link for inclusion in the interactive preview from a plurality of available preview images;
    insert the interactive preview into the message prior to transmitting the message;
    prior to transmitting the message, detect a selection of a first permission setting for the interactive preview and a second permission setting, the first permission setting specifying whether a recipient of the message is permitted to select a different preview image from the plurality of available preview images for inclusion in the interactive preview after the recipient receives the message and the second permission setting specifying whether a recipient of the message is permitted to edit the content associated with the link;
    prior to transmitting the message, insert the first permission setting and the second permission setting into the metadata; and
    in response to detecting a transmission of the message, transmit the metadata to the content provider for synchronization such that the metadata of the content stored at the content provider is updated with the second permission setting.

2. The computing device of claim 1, wherein the processor is further configured to:
update the metadata associated with the link with a change resulting from execution of a custom operation; and
transmit the updated metadata to the content provider to allow the content provider to synchronize the metadata associated with the link with the change.

3. The computing device of claim 1, wherein the processor is further configured to:
extract at least one of the plurality of available preview images of the content from the metadata; and
display the preview image in the interactive preview.

4. The computing device of claim 1, wherein the processor is further configured to:
in response to detecting the transmission of the message, execute an operation associated with the selectable action, wherein the selectable action includes an edit action, an add attachment action, a choose-preview-image action, a remove preview action, a remove-preview-image action, or a change permission action.

5. The computing device of claim 1, wherein the processor is further configured to:
provide to be displayed the interactive preview adjacent to a location of the insertion of the link within the message.

6. The computing device of claim 1, wherein the processor is further configured to:
detect through the metadata that the content includes text; and
select a sample of the text to insert into the interactive preview, wherein the sample of the text includes a title of the content and a summary of the content.

7. The computing device of claim 6, wherein the processor is further configured to:
detect a selection of an edit action by the user;
provide a control on the interactive preview to edit the sample;
detect a change to the sample of text within the interactive preview as edited by the user via the control; and
transmit the change to the content provider to allow the content provider to synchronize the text of the content with the change.

8. The computing device of claim 1, wherein the selectable action is a choose-preview-image action and the processor is further configured to:
detect a content type of the content associated with the link; and
locate the plurality of available preview images associated with the content type from one or more preview image providers that includes the content provider.

9. The computing device of claim 8, wherein the processor is further configured to:
provide to be displayed the plurality of available preview images to allow the user to select one of the plurality of available preview images to be included in the interactive preview;
detect a selection of one of the plurality of available preview images; and
provide to be displayed the selected preview image in the interactive preview.

10. The computing device of claim 1, wherein the processor is further configured to:
detect a selection of a remove-preview-image action by the user; and
remove a preview image of the content that is displayed in the interactive preview.

11. A method executed on a computing device to provide an interactive preview within a communication, the method comprising:
detecting an insertion of a link into a message during composition of the message;
in response to detecting the insertion of the link into the message, retrieving, prior to transmitting the message, metadata associated with the link from a content provider;
generating, prior to transmitting the message, the interactive preview for content associated with the link based on the metadata, wherein the interactive preview includes a selectable action to allow a user to select, prior to transmitting the message, a preview image associated with the link for inclusion in the interactive preview from a plurality of available preview images;
inserting the interactive preview into the message prior to transmitting the message;

prior to transmitting the message, detecting a selection of a first permission setting for the interactive preview and a second permission setting, the first permission setting specifying whether a recipient of the message is permitted to select a different preview image from the plurality of available preview images for inclusion in the interactive preview after the recipient receives the message and the second permission setting specifying whether a recipient of the message is permitted to edit the content associated with the link;

prior to transmitting the message, inserting the first permission setting and the second permission setting into the metadata; and in response to detecting a transmission of the message, transmitting the metadata to the content provider for synchronization such that the metadata of the content stored at the content provider is updated with the second permission setting.

12. The method of claim 11, wherein the method further comprises:

detecting a selection of a remove-preview action; and
removing the interactive preview.

13. The method of claim 11, further comprising:

providing to be displayed a user-provided rating for the content within the interactive preview.

14. The method of claim 11, wherein the method further comprises:

detecting a selection of related content action; and
querying the content provider to retrieve related content metadata of a related content associated with the content, wherein the related content metadata includes a title and a summary of the related content.

15. The method of claim 14, further comprising:

generating a related content section from the related content metadata; and
inserting the related content section into the interactive preview.

16. A server for providing an interactive preview within a communication, the server comprising:

a memory configured to store instructions; and
a processor coupled to the memory, wherein the processor in conjunction with instructions stored in the memory is configured to:

detect an insertion of a link into a message during composition of the message;
in response to detecting the insertion of the link into the message, retrieve, prior to transmitting the message, metadata associated with the link from a content provider;
generate, prior to transmitting the message, the interactive preview for content associated with the link based on the metadata, wherein the interactive preview includes a selectable action to allow a user to select, prior to transmitting the message, a preview image associated with the link for inclusion in the interactive preview from a plurality of available preview images;
insert the interactive preview into the message prior to transmitting the message;
prior to transmitting the message, detect a selection of a first permission setting for the interactive preview and a second permission setting, the first permission setting specifying whether a recipient of the message is permitted to select a different preview image from the plurality of available preview images for inclusion in the interactive preview after the recipient receives the message and the second permission setting specifying whether a recipient of the message is permitted to edit the content associated with the link;
prior to transmitting the message, insert the first permission setting and the second permission setting into the metadata; and
in response to detecting a transmission of the message, transmit the metadata to the content provider for synchronization such that the metadata of the content stored at the content provider is updated with the second permission setting.

17. The server according to claim 16, wherein the processor is further configured to:

detect through the metadata that the content includes text;
select a sample of the text to insert into the interactive preview, wherein the sample of the text includes a title of the content and a summary of the content; and
detect a selection of an edit action by the user, that when selected allows the user to edit the sample;
provide a control on the interactive preview to edit the sample;
detect a change to the sample within the interactive preview as edited by the user via the control; and
transmit the change to the content provider to allow the content provider to synchronize the text of the content with the change.

18. The server according to claim 16, wherein the processor is further configured to:

provide to be displayed a user-provided rating for the content within the interactive preview.

* * * * *